(12) United States Patent
Curry et al.

(10) Patent No.: US 6,923,483 B2
(45) Date of Patent: Aug. 2, 2005

(54) BUMPER AIRBAG AND SYSTEM

(75) Inventors: Paul G. Curry, Phoenix, AZ (US);
Wesley Pack, Gilbert, AZ (US); Steve
Hailstone, Chandler, AZ (US); **Jeffrey
A. Baker, Zeeland, MI (US); Robert V.
McClenathan**, Wixom, MI (US);
Michael T. Vecchio, Livonia, MI (US);
Saeed David Barbat, Farmington Hills,
MI (US); Priyaranjan Prasad,
Plymouth, MI (US)

(73) Assignee: Universal Propulsion Company, Inc.,
Phoenix, AZ (US)

( * ) Notice: Subject to any disclaimer, the term of this
patent is extended or adjusted under 35
U.S.C. 154(b) by 0 days.

(21) Appl. No.: 10/250,602

(22) PCT Filed: Jan. 10, 2002

(86) PCT No.: PCT/US02/01033

§ 371 (c)(1),
(2), (4) Date: Feb. 4, 2004

(87) PCT Pub. No.: WO02/055343

PCT Pub. Date: Jul. 18, 2002

(65) Prior Publication Data

US 2005/0087998 A1 Apr. 28, 2005

Related U.S. Application Data

(60) Provisional application No. 60/261,056, filed on Jan. 11, 2001.

(51) Int. Cl.[7] ............................................. B60R 19/20
(52) U.S. Cl. .......................... 293/107; 180/274; 342/72
(58) Field of Search .................................. 293/1, 2, 107,
293/110, 118, 119; 180/271, 274; 342/72

(56) References Cited

U.S. PATENT DOCUMENTS

| | | |
|---|---|---|
| 3,656,791 A | 4/1972 | Truesdell |
| 3,708,194 A | 1/1973 | Amit |
| 3,822,076 A * | 7/1974 | Mercie ret al. ............. 293/107 |
| 4,176,858 A | 12/1979 | Kornhauser |
| 4,518,183 A | 5/1985 | Lee |
| 4,930,823 A | 6/1990 | Rivera |
| 5,106,137 A | 4/1992 | Curtis |
| 5,431,463 A | 7/1995 | Chou |
| 5,646,613 A * | 7/1997 | Cho ........................... 180/169 |

(Continued)

FOREIGN PATENT DOCUMENTS

EP      1024063      8/2000

(Continued)

Primary Examiner—Lon L. Coletta
(74) Attorney, Agent, or Firm—Jerry Holden; John D. Titus

(57) ABSTRACT

An airbag (10) for mounting in the bumper (18) of a motor vehicle (12) is provided. The airbag can have an up-side-down "L" shape or a cylindrical shape. Further, multiple bags can be combined within one system. The airbag is configured to cover substantially the width of the vehicle upon deployment and also provide protection to the occupant of a struck vehicle (36) in the event the occupant is partially expelled from the struck vehicle in the direction of the bag. The airbag is combined with an inflation (23), collision sensor (34) and an electronic control unit (38) to form the airbag system.

24 Claims, 7 Drawing Sheets

U.S. PATENT DOCUMENTS

| | | | |
|---|---|---|---|
| 5,651,569 A | 7/1997 | Molnar | |
| 5,725,265 A | 3/1998 | Baber | |
| 5,732,785 A * | 3/1998 | Ran et al. | 180/274 |
| 6,056,336 A | 5/2000 | Balgobin | |
| 6,106,038 A * | 8/2000 | Dreher | 293/107 |
| 6,126,214 A | 10/2000 | Kim | |
| 6,227,325 B1 * | 5/2001 | Shah | 180/274 |
| 6,450,556 B1 | 9/2002 | Jacobs | |

FOREIGN PATENT DOCUMENTS

| | | |
|---|---|---|
| JP | 04298710 | 5/1994 |
| JP | 6144154 | 5/1994 |
| WO | 98/50254 | 11/1998 |

* cited by examiner

BUMPER AIRBAG AND SYSTEM

CROSS REFERENCE TO RELATED APPLICATION

This application claims priority to co-pending Provisional Patent Application having Ser. No. 60/261,056, filed Jan. 11, 2001, which is incorporated herein by reference.

TECHNICAL FIELD

This invention relates generally to motor vehicle safety devices and in particular to an inflatable airbag for use in the bumper area of a motor vehicle.

BACKGROUND OF THE INVENTION

For years, the automotive industry has tried various methods and products to reduce the damage to passengers and vehicles in collisions. Of prime importance are the various systems of vehicle airbags that are deployed upon the sensing of an actual collision. These airbags are located in and about the passenger compartment of the motor vehicle and are inflated to surround and protect the occupants from serious injury.

Other methods of reducing, to some extent, the forces created in a collision from injuring the occupants are various attempts to provide "crush zones" at the front and the rear of the vehicle to absorb some of the collision forces. Still other methods also deal with design of the vehicle frame, engine mounts and other structural members to absorb the forces by means of controlled structural collapsing.

Airbags have been fabricated to the front end of the vehicle that just prior to the instance of a crash, inflate and form a fluid-filled structure between the striking object or vehicle and the struck object or vehicle. PCT application number WO98/50254 "Collision Protection System for Vehicles" teaches airbags mounted to the front of a vehicle. U.S. Pat. No. 3,656,791 "Vehicle Impact-Cushioning Device" teaches an airbag mounted to deploy from the front end of a vehicle. U.S. Pat. No. 3,708,194 "Vehicle Safety Apparatus" teaches a front-end mounted airbag that includes a fire extinguishing material.

Several prior art patents deal with bumper improvements. U.S. Pat. No. 4,518,183 "Extendible Safety Impact Bags for Vehicles" teaches mechanisms for extending bumpers outwardly of the vehicle upon the sensing of a potential crash. Air is supplied to airbags to form a somewhat rigid member supporting the bumpers for the duration of the crash and then the airbags are deflated and the bumpers return to their normal position. U.S. Pat. No. 4,930,823 "Vehicle Bumper" teaches front and rear bumpers having airbags that are inflated upon contact of the bumper with an object. U.S. Pat. No. 5,106,137 "Vehicle Bumper with Combination Foam and Airbag Energy Absorber" teaches a bumper having an internal cavity surrounded by compressible energy absorbing plastic. Inside the cavity is an airbag that is inflated upon the onset of a crash to provide more protection to the front or rear end of the vehicle.

U.S. Pat. No. 5,651,569 "Inflatable Bumper System" teaches a bumper having an enclosed airbag that is permanently inflated to provide a permanent cushion bumper. U.S. Pat. No. 5,725,265 "Airbag System For Vehicle Bumpers" teaches an airbag concealed inside a bumper that is inflated and extends outwardly of the bumper to reduce the effects of the crash. The bumper has an expellable panel on the outer surface of the bumper that is removed by the inflation of the airbag. U.S. Pat. No. 6,056,336 "Airbag with Internal Shock Absorber" teaches a bumper airbag having an internal shock absorber. The airbag is deployed in a circular shape. U.S. Pat. No. 6,126,214 "Air Bumper" teaches an air inflatable bumper that responds to a crash to provide an air-supported member to protect the car from damages due to collision.

Several prior art patents show a system for the detection of a crash and the deployment of airbags. U.S. Pat. No. 3,822,076 "Fluid Shock Absorbing Buffer, teaches a front or rear mounted airbags that are inflated when a telescopic rod extending from the vehicle touches a barrier. U.S. Pat. No. 4,176,858 "Energy Absorbing Bumper System" teaches a combination of a pneumatic bumper system supporting an airbag system that deploys in response to increased pressure in the pneumatic system as a result of an impact with an object.

U.S. Pat. No. 5,431,463 "Air Cell Bumper Device" teaches a plurality of air cells containing grouped around a much larger air cell that stores inflation fluid. Upon impact, the material of cells is such that the larger cell ruptures and the fluid therein flows to the smaller cells buffering the impact. The invention is particularly useful on the sides of a vehicle. U.S. Pat. No. 5,646,613 "System for Minimizing Automobile Collision Damage" teaches the storage and deployment of various airbags around the vehicle as a result of proximity sensing. The different sides of the vehicle are uniquely controlled. U.S. Pat. No. 5,732,785 "Proactive Exterior Airbag System and Its Deployment Method for a Motor Vehicle" teaches a system having a detection unit, a control unit, and a deployment unit together will deploy airbags mounted on the vehicle. This system deploys the airbags before the crash and describes the method used to determine distance and speed between the striking and struck vehicles or objects.

European Patent Application EP 1,024,063 "Vehicle Bumper and Hood Airbag System" teaches a bumper and hood bag that is inflated prior to the collision of a pedestrian and the vehicle. The airbag is inflated to absorb the collision forces between the areas from the waist down of a pedestrian and the vehicle. JP 6,144,154 "Shock Relaxing Device" teaches an airbag deployed in front of a bumper to reduce the shock of a pedestrian or bike collision with a car.

The increased popularity of sports utility vehicles, passenger trucks and other retail motor vehicles that stand higher than a standard motor vehicle, such as a sedan or sports car, has created new problems in the area of vehicle collisions. Specifically, when one of these higher standing vehicles broadsides a standard vehicle, because of the difference in height between the two vehicles, the bumper of the high vehicle will contact the side window portion of the struck vehicle instead of the door portion. If the collision happens at high speeds, the head of the occupant sitting adjacent the window portion may move outward past the window and into contact with the bumper of the higher vehicle.

Accordingly, there is a need for an airbag that can reduce the severity of such collisions.

SUMMARY OF THE INVENTION

An advantage of the present invention is that it can reduce the severity of a collision between high standing vehicle and a low standing vehicle.

Another advantage of the present invention is that it offers protection to the occupant of the struck vehicle in the event the occupant is partially expelled in the direction of the invention.

These and other advantages will be found in the present invention that is directed to an airbag assembly mounted behind a vehicle's bumper coupled with sensors, electronic control units, and inflators to inflate by means of a fluid pressure to expand and provide an interface between a striking and struck motor vehicles. The airbag can have an up-side-down "L" shape or a cylindrical shape. Further, multiple bags can be combined within one system. The airbag is configured to cover substantially the width of the vehicle upon deployment and also provide protection to the occupant of a struck vehicle in the event the occupant is partially expelled from the struck vehicle in the direction of the bag.

DETAILED DESCRIPTION OF THE PREFERRED EMBODIMENT

Figure 1:
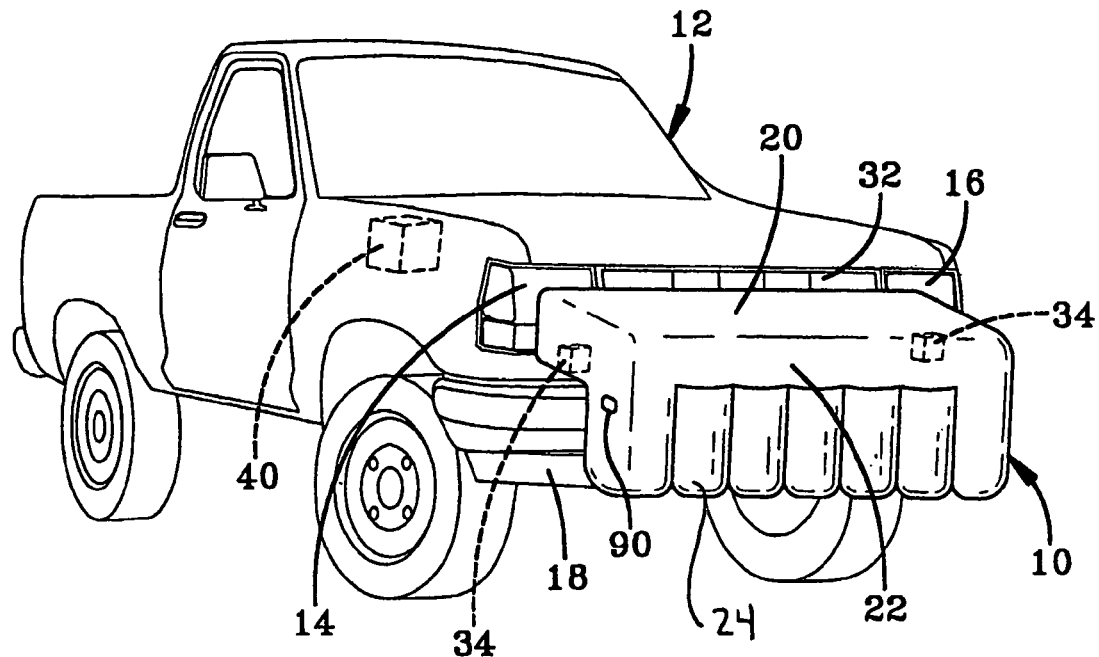
FIG. 1 is a perspective view of a high standing vehicle having a one embodiment of a bumper airbag as contemplated by the present invention.
Figure 2:
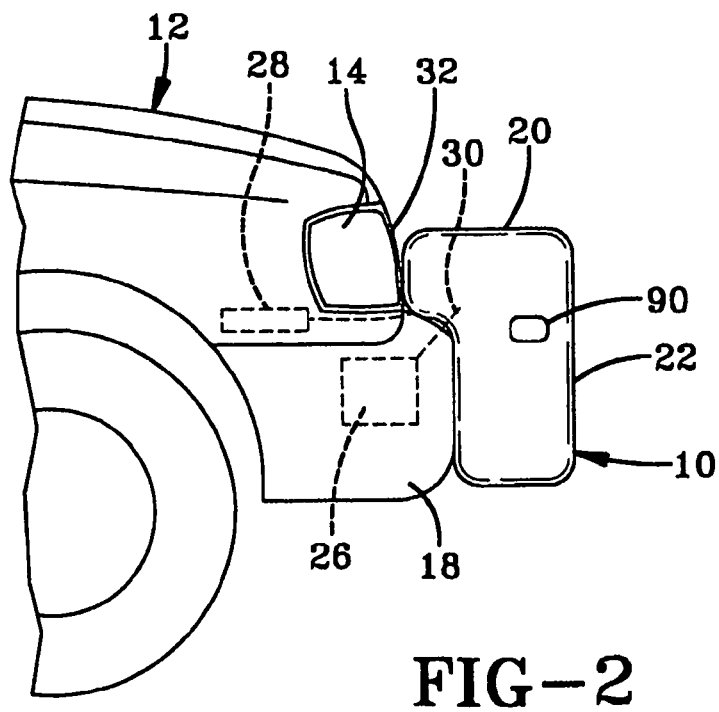
FIG. 2 is the partial side view of the vehicle and bumper airbag of FIG. 1.
Figure 3:
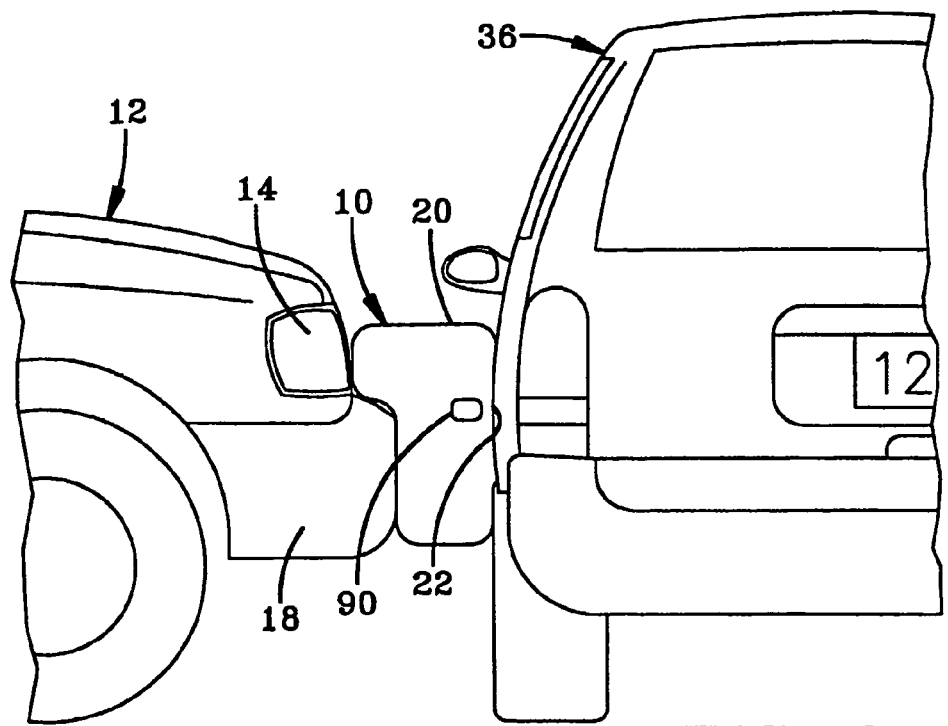
FIG. 3 is an illustration of a collision between the vehicle of FIG. 1 and another vehicle.

Referring to FIGS. 1–3, a first embodiment of a bumper airbag as contemplated by the present invention is generally denoted by reference numeral 10. An important feature of the airbag 10 is its ability to extend across a substantial portion of the width of the vehicle. By substantial it is meant at least 65% of the width of the vehicle or extending at least between the vehicle's headlamps 14 and 16. It will be appreciated that the airbag can have a number of different shapes as will be described herein.

In the first embodiment of the present invention, the airbag 10 has a up-side-down "L" shape and extends forward from the bumper 18 along a base portion 20. An arm portion 22 extends perpendicularly downward from the base portion 20 and includes a plurality of tubular portions 24. In the preferred embodiment, the diameter of each of the tubular portions 24 is about nine inches (23 cm).

The airbag 10 is stored in a folded condition in a housing 26 mounted behind the bumper 18. At least one or more inflators 28 are connected to the folded airbag 10. The airbag 10 is fixedly mounted to the housing 26 and therefore to the vehicle 12. The housing 26 has a frangible door or cover 30, which in the embodiment illustrated in FIG. 2 is located in a direction facing up. As the airbag 10 inflates, it pushes the frangible door 30 open and then proceeds to expand over the bumper 18. The frangible door 30 may be hinged to open against the grille member 32 or toward the bumper 18 or in the alternative the frangible door 30 may be removed.

Figure 13:
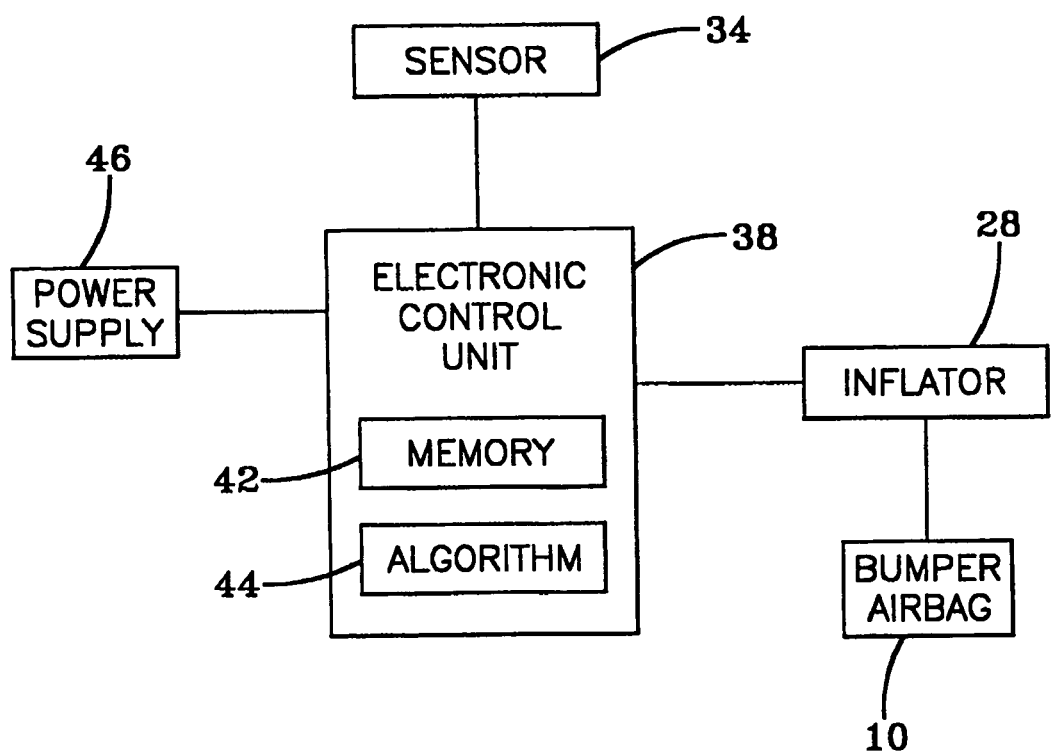
FIG. 13 is a block diagram of a control system for a bumper airbag contemplated by the present invention.

At least one sensor 34 is mounted on the front of the vehicle 12 for sensing an imminent collision with a second vehicle. As shown in FIG. 13, the sensor 34 is electrically connected to an electronic control unit, (ECU), 38 that is mounted in a housing 40 on the firewall of the vehicle 12 or inside the vehicle cab. Located in the ECU 38 is a memory unit 42 that contains one or more algorithms 44 at least one of which controls the inflation of the airbag member 10. A power supply 46 is electrically connected to the ECU 38 to electrically power all of the electrical components of the system. There are many types of sensors 34 that are applicable such as a proximity sensor or a crash-responsive sensor.

Referring to FIG. 2, one end of the base portion 20 is approximately tangentially aligned with the grille member 32. The grille member 32 is typically a curved member and the airbag member 10 is typically a straight tubular member hence the tangential relationship. In some applications this end of the base portion 20 will abut the grille 32 while in other applications it will not touch the grille 32 upon inflation.

Of prime importance in the bumper mounted airbags of the present invention is the concern for the occupant of the struck motor vehicle 36, see FIG. 3. Tests have shown that the occupant can be partially thrown out of the window of the struck vehicle depending on the severity of the crash. To reduce injury to the thrown occupant, the corners where the end portion 20 meets the arm portion 22 are rounded. Also, the outer surface of the airbag 10 is made smooth and nonabrasive. Hence, when the occupant, more particularly the head of the occupant, is forced out of the window, the head strikes the smooth, nonabrasive, rounded airbag surface thereby reducing the severity of injury.

The airbag 10 is filled with a gas from a gas inflator 28 which is preferably a cold gas inflator so as to avoid the hot has temperatures associated with typical hot gas inflators used in conventional steering wheel or dashboard mounted airbags.

The airbag 10 is preferably made from a woven polyester and/or nylon laminated or non-laminated material that is coated in such a manner as to prevent any leakage. The airbag 10 is non-porous.

Figure 6:
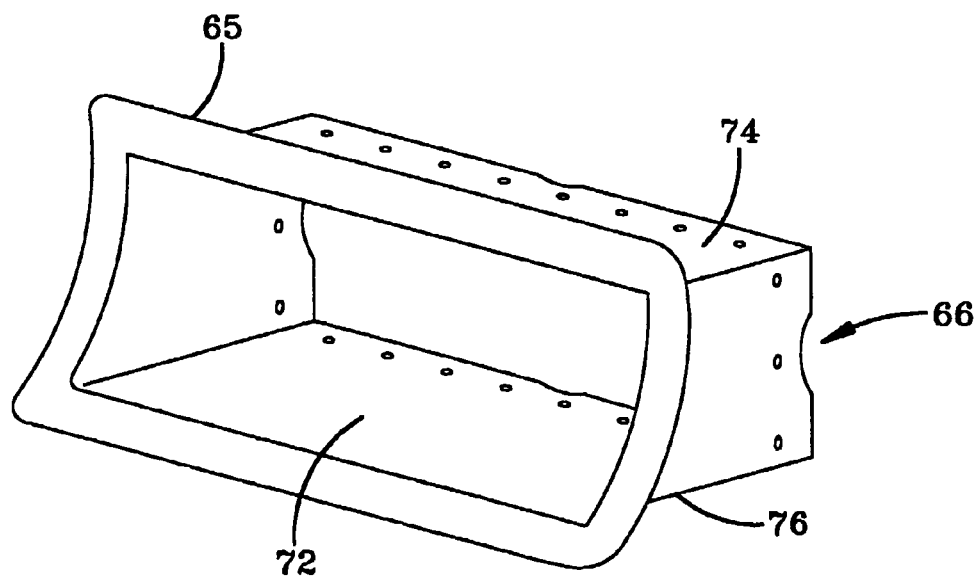
FIG. 6 is a perspective view of the throat of the bumper airbag of FIG. 5.
Figure 7:
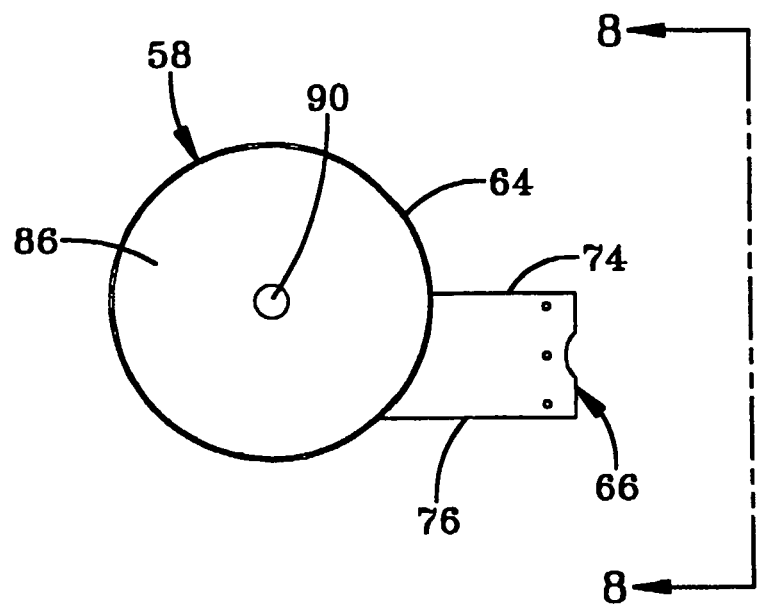
FIG. 7 is an end view of the bumper airbag of FIG. 5.
Figure 8:
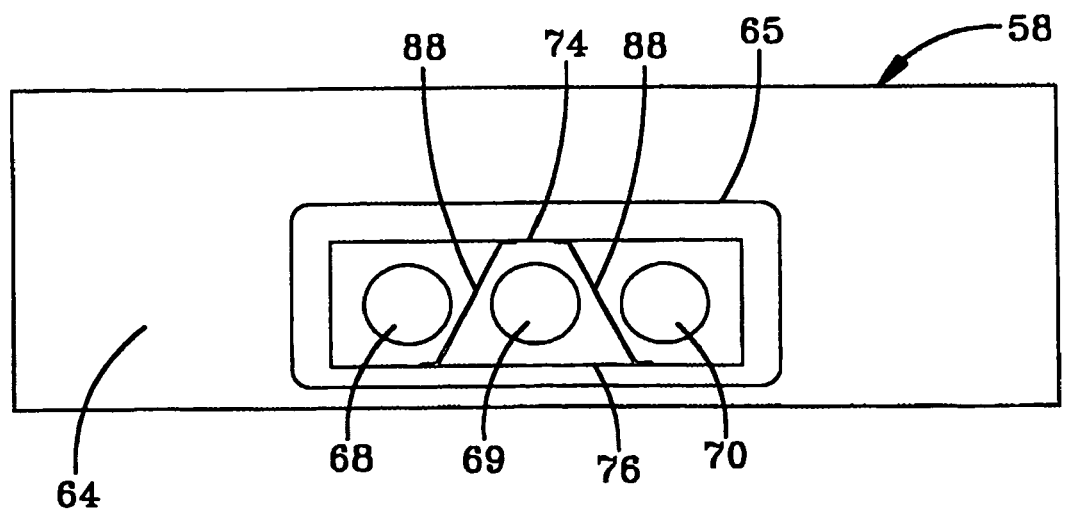
FIG. 8 is a view taken along line 8—8 of FIG. 7.
Figure 9:
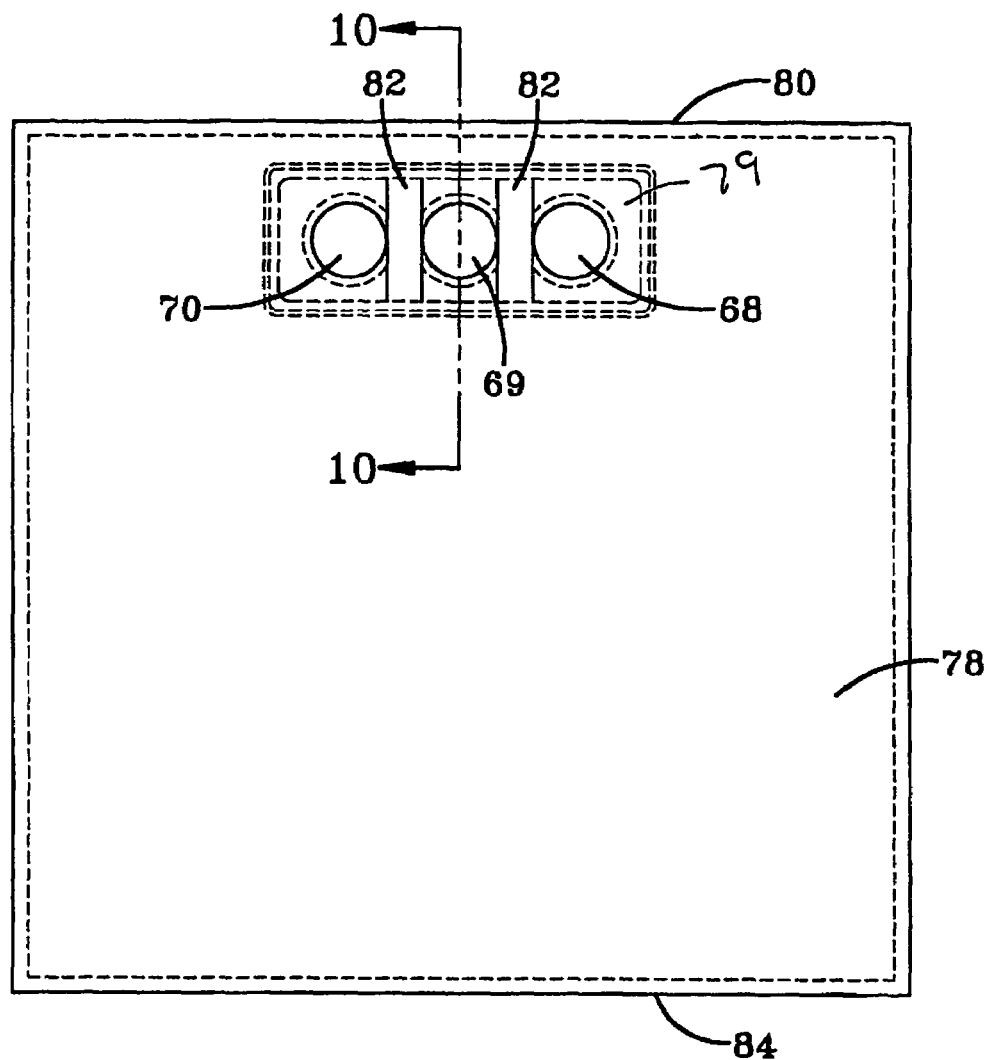
FIG. 9 is a plan view of the fabric layout of the bumper airbag of FIG. 5.
Figure 10:
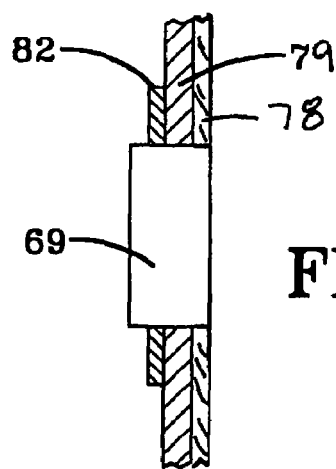
FIG. 10 is a view taken along line 10—10 of FIG. 9.
Figure 11:
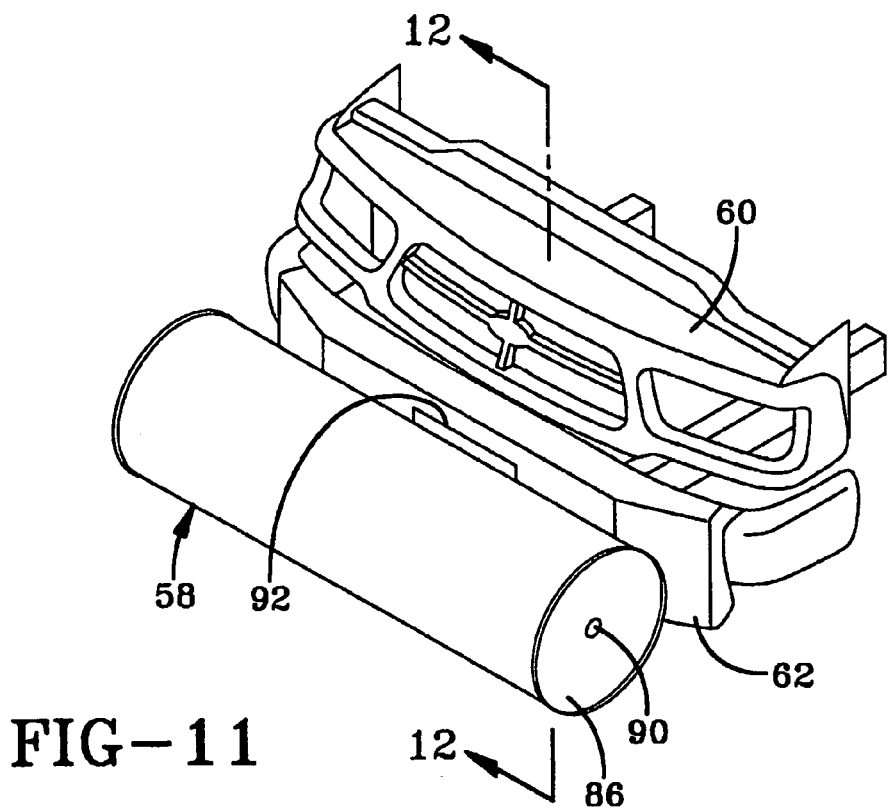
FIG. 11 is a perspective view of the bumper airbag of FIG. 5 mounted on the bumper of a vehicle.

Referring to FIGS. 4–12, a second embodiment of a bumper airbag as contemplated by the present invention is generally denoted by reference numeral 58. As with the airbag 10, an important feature of the airbag 58 is its ability, when inflated, to extend across a substantial portion of the width of the vehicle as shown in FIG. 11. The bumper airbag 58 when fully inflated is a circular cylindrical bag. Along the side 64 of the airbag 58 is a rectangular connecting housing or throat member 66, shown in FIG. 6, that couples the airbag 58 to a housing 96 disposed within the bumper 62 of vehicle 60. The throat member 66 is connected to the airbag 58 by a flange 65 surrounding the throat member. The flange 65 may be sewn or bonded to the airbag. The mating side of the flange 65 is shown in FIG. 6. Inside the throat 66 are preferably three inlets or holes 68, 69, 70, (see FIG. 8), in the wall of the airbag bag 58. As shown in FIG. 7 the connecting housing or throat 66 has parallel walls 74,76 with the wall 76 longer than the wall 74 so as to allow the throat 66 to be mounted to the curved surface of the airbag 58.

As shown in FIG. 9, the throat member 66 is sewn, (dashed lines) to a sheet or panel of fabric 78 from which the airbag 58 is formed. The throat member 66 is attached to panel 78 near one of its edges 80. To assemble the cylindrical bumper bag 58, the panel 78 is sewn to a panel of fabric 79 that is slightly less than the size of the rectangular connecting throat 66. The seams are tight so as to block any inflation fluid from escaping through these seams when the bumper airbag 58 is inflated. In the preferred embodiment, before the two fabrics are mated, the inlet holes 68,69,70 are punched through the panels 78,79 and then aligned. In an alternate between adjacent inlet holes 68,69,70 is a reinforcing member 82 preferably made of seat belt webbing material. FIG. 10 illustrates the reinforcing member 82 on the outer surface of panel 79. Alternatively, the reinforcing member may be mounted between the two panels.

After mounting the reinforced members 82, the rectangular connecting member or throat member 66 is sown to the panel 78 so as to encompass the inlet holes. Next the two edges 80, 84 of panel 78 are sown together forming a flat tubular member with open opposed ends. In order to give the bumper bag a cylindrical shape, circular end caps 86 are sown to the open opposed ends. In all cases the thread count and the thread used such as 138 Nylon, is very strong and the stitches are relatively tight. Some of the stitching is accomplished by double needle sewing machines.

Optionally in order to keep the throat member 66 of in its rectangular shape, one or more tethers 88 are secured to the inside of the throat member 66 extending between the two long parallel walls 74,76. If tethers 88 are used, they are sown to the throat member 66 before it is sown to the panel 78.

Along the axis of each circular end cap 86 and the sides of the airbags 10 and 58 is an open venting hole 90 of such a size to allow the bumper airbags 10, 58 to deflate some time after the crash.

Figure 12:
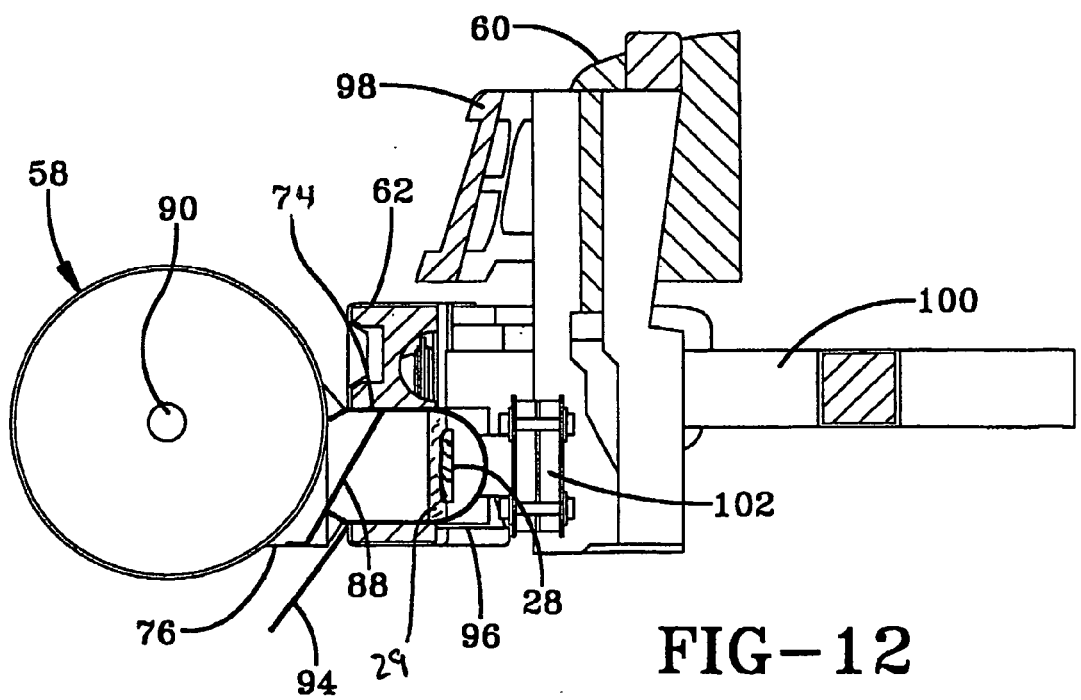
FIG. 12 is a cross-sectional side taken along line 12—12 of FIG. 11.

Referring to FIGS. 11 and 12, an inflated cylindrical bumper airbag 58 is deployed from the bumper 62 of a truck located below the vehicle's grille 98 and supported by the vehicle's frame rails 100. In the center of the bumper 62, is an opening 92 that is enclosed by a frangible door 94. The folded airbag 58 is mounted in an airbag housing 96 disposed in the bumper behind the door 94. Also, mounted in the housing 96 is an inflator 28 separated from the airbag 58 by a burst disk 29. Upon inflation, the airbag 58 forces the door 94 open. The door 94 is hinged to allow it to rotate out of the path of the bumper airbag. The throat member 66 is secured to the housing 96.

As the inflated airbag 58 contacts the other vehicle, the pressure in the bag increases. To prevent an over pressure situation where the bag could burst, a relief valve 102 mounted at the rear of the bumper bag housing 96. The valve 102 operates to bleed off pressure above a certain level from the airbag, thus maintaining the bag at its desired pressure. As the crash proceeds, the pressure in the air bag is released through the vent holes 90 causing the bag to deflate. This deflation of the airbag continues the energy attenuation of the crash.

Figure 4:
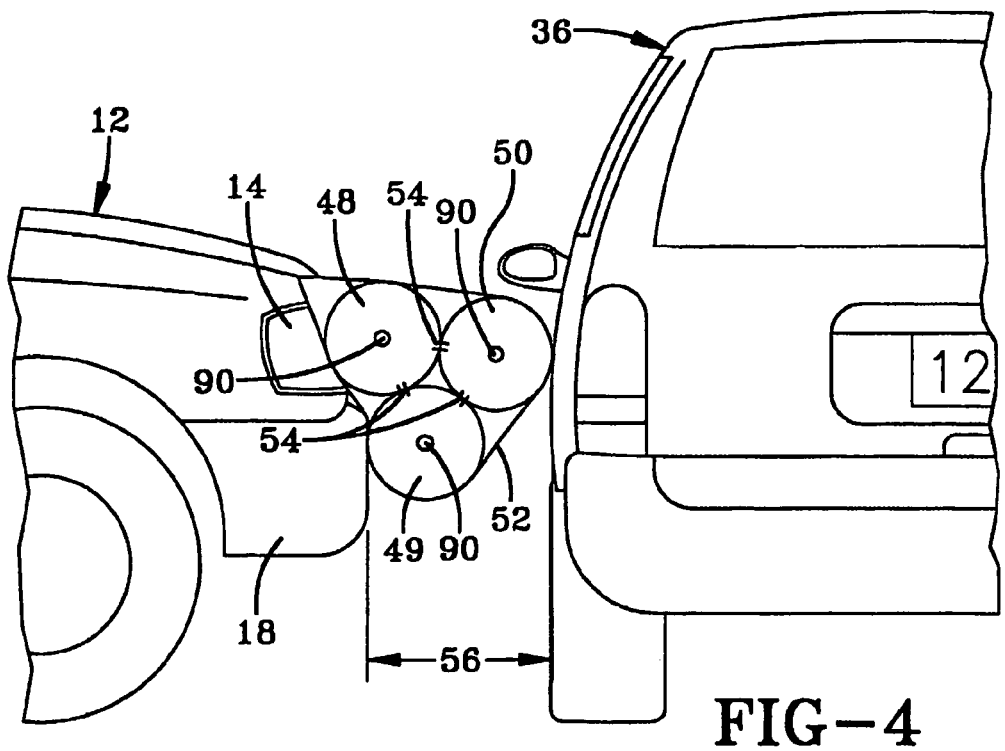
FIG. 4 is an illustration of the collision of FIG. 3 with the high standing vehicle having a second embodiment of a bumper airbag as contemplated by the present invention.
Figure 5:
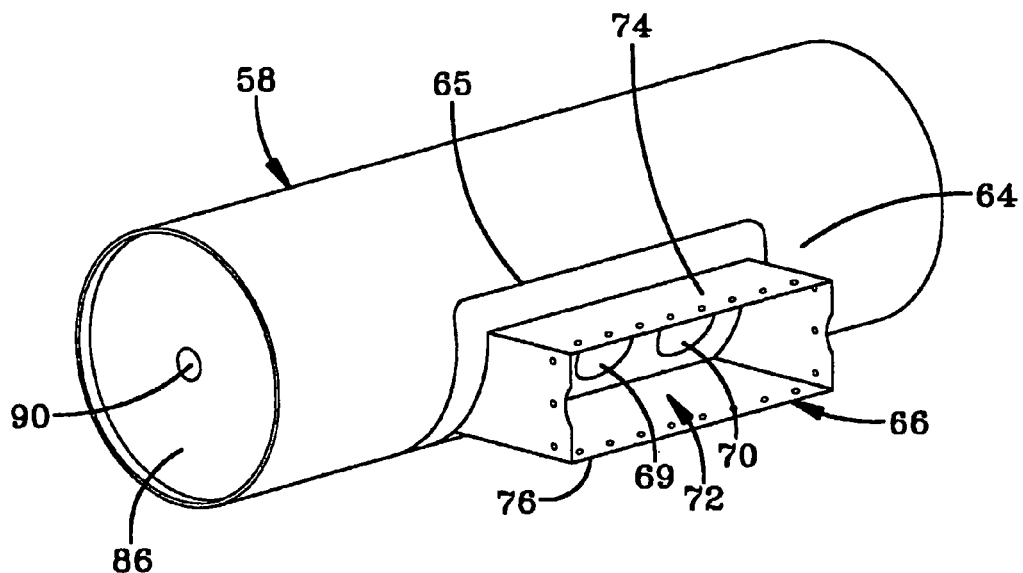
FIG. 5 is a perspective view of a third embodiment of a bumper airbag as contemplated by the present invention.

Referring to FIG. 4, multiple cylindrical airbags 48,49,50 can be combined to operate together. When there are at least two airbags 48, 49, they are secured together by a tether 52 and have a plurality of communication ports 54 therebetween. The communication ports 54 are typically holes surrounded by a reinforcing washer. The washer also functions to secure one airbag to another. The outside surfaces of the airbags 48–50 are nonabrasive and puncture-proof. Puncture-proof is important so that the rubbing of the airbags 48–50 on the struck motor vehicle 36 does not cause tearing. Nonabrasive surface protects the occupants of the struck motor vehicle 36 from being injured in the event the occupant is partially ejected from the vehicle.

Thus, a bumper airbag for use in conjunction with a bumper of a vehicle is provided that reduces the transmission of energy in the event of a collision. The bumper airbag is particularly useful with high standing vehicles. The bumper airbag also provides protection to the occupant of the vehicle should the occupant be partially expelled from the struck vehicle in the direction of the bag.

Various modifications and alterations to the above-described preferred embodiments will be apparent to those skilled in the art. Accordingly, this description of the invention should be considered exemplary and not as limiting the scope and spirit of the invention as set forth in the following claims.

What is claimed is:

1. A bumper airbag system comprising:
   a housing disposed in the bumper of a vehicle and having a frangible door;
   a sensor for determining a pending collision between the first vehicle and another object and generating a signal thereof;
   at least one inflator for dispensing inflation fluid in response to the signal; and
   an airbag stored in the housing in a folded condition, the airbag operatively connected to the inflator, whereby upon the firing of the inflator, the airbag inflates opening the frangible door and expanding out from and over the bumper to cover a substantial portion of the width of the vehicle.

2. The bumper airbag system of claim 1 further comprising an electronic control unit for processing the signal from the sensor and generating the signal to the inflator.

3. The bumper airbag system of claim 1 wherein upon inflation the bumper airbag has an up-side-down "L" shape defined a base portion extending away from the bumper and an arm portion extending downward from the base portion.

4. The bumper airbag system of claim 3 wherein the arm portion has a plurality of tubular members.

5. The bumper airbag system of claim 1 wherein the bumper airbag is fabricated from a woven polyester laminated material to provide a non-porous enclosure.

6. The bumper airbag system of claim 5 wherein the bumper airbag further comprises a nonabrasive, puncture resistant coating on its outer surface.

7. The bumper airbag system of claim 1 further comprising at least one pressure relief device.

8. The bumper airbag system of claim 7 wherein the pressure relief device is at least one hole in the airbag.

9. The bumper airbag system of claim 7 wherein the pressure relief device is a valve mounted in the housing.

10. The bumper airbag system of claim 1 further comprising a burst disk disposed between the inflator and the airbag.

11. The bumper airbag system of claim 1 wherein upon inflation the airbag takes on a cylindrical shape.

12. The bumper airbag system of claim 11 wherein the airbag further comprises a throat member having at least one hole for the inflating gas from the inflator to pass into the interior of the airbag.

13. The bumper airbag system of claim 12 wherein the throat member is attached at one end to the housing.

14. The bumper airbag system of claim 1 wherein the airbag upon inflation is comprised of a plurality of cylindrically shaped bags.

15. The bumper airbag system of claim 14 wherein each of the plurality of cylindrically shaped bags are secured together in such a manner that two of the bags cover the grille of the vehicle and another bag is disposed beyond the other two bags and away from the grille.

16. The bumper airbag system of claim 15 wherein the bags are secured by tethers.

17. The bumper airbag system of claim 14 wherein each of the bags abuts the others.

18. The bumper airbag system of claim 14 further comprising fluid communication ports between the bags.

19. A bumper airbag comprising:
a first rectangular panel of fabric having four edges, the panel being rolled and two edges being attached to form a cylinder;
a second rectangular panel of fabric substantially smaller than the first panel and sewn to the outer surface of the first panel near one of the edges;
at least one hole extending through both panels; and
a throat member attached to the first panel and encompassing the second panel.

20. The bumper airbag of claim 19 wherein the throat member has a flange at one end for attaching to a curved surface of the first rectangular panel and opening at its other end for receiving inflating gas.

21. The bumper airbag of claim 20 further comprising at least one support tether secured to inside of the throat member.

22. The bumper airbag of claim 19 wherein having a plurality of holes extending through the two panels and a reinforcing member disposed between adjacent holes.

23. The bumper airbag of claim 19 further comprising a circular end cap attached at the open ends of the first rectangular panel.

24. The bumper airbag of claim 23 wherein each circular end cap has a vent hole.

* * * * *